United States Patent [19]
Uhl

[11] Patent Number: 5,819,418
[45] Date of Patent: Oct. 13, 1998

[54] WORKING TOOL FOR TRIMMING TREES

[75] Inventor: Klaus-Martin Uhl, Baltmannsweiler, Germany

[73] Assignee: Andreas Stihl, Waiblingen, Germany

[21] Appl. No.: 850,630

[22] Filed: May 2, 1997

[30] Foreign Application Priority Data

May 4, 1996 [DE] Germany .................. 196 18 025.2

[51] Int. Cl.[6] .................................................. B23D 57/02
[52] U.S. Cl. ........................... 30/296.1; 30/383; 464/172
[58] Field of Search .............................. 30/283, 381, 276, 30/296.1; 464/172

[56] References Cited

U.S. PATENT DOCUMENTS

| Re. 34,358 | 8/1993 | Miller . | |
|---|---|---|---|
| 2,815,048 | 12/1957 | Davis . | |
| 3,657,813 | 4/1972 | Knight . | |
| 3,688,139 | 8/1972 | Yaguchi . | |
| 4,122,601 | 10/1978 | Katsuya . | |
| 4,505,040 | 3/1985 | Everts . | |
| 4,654,971 | 4/1987 | Fettes et al. . | |
| 4,924,573 | 5/1990 | Huddleston et al. . | |
| 4,976,031 | 12/1990 | Miller . | |
| 5,013,282 | 5/1991 | Keller | 464/172 |

FOREIGN PATENT DOCUMENTS 3213185  10/1983  Germany .

Primary Examiner—Douglas D. Watts
Attorney, Agent, or Firm—Robert W. Becker & Associates

[57] ABSTRACT

A hand-guided working tool has a telescopic rod with a first and a second end and a drive motor connected to the first end. A working tool is connected to the second end of the telescopic rod. A telescopic drive shaft is enclosed in the telescopic rod. A first end of the telescopic drive shaft is connected to the drive motor and a second end of the telescopic drive shaft is connected to the working tool. The telescopic rod has an outer tube and an inner tube inserted with a leading end into the outer tube. The inner tube displaceable in the longitudinal direction of the telescopic rod. The telescopic drive shaft has a shaft tube and a shaft rod enclosed in the shaft tube. At least two bearings are arranged in the outer tube for rotatably supporting the telescopic drive shaft. They are spaced from one another in the longitudinal direction of the telescopic rod. The bearings include a cylindrical bearing sleeve having an outer mantle surface resting at the inner wall of the outer tube and also include an inner bearing positioned inside the cylindrical bearing sleeve. The bearing sleeve of a first bearing is mounted on the leading end of the inner tube. It forms a slide bearing for displacing the inner tube in the outer tube.

21 Claims, 7 Drawing Sheets

WORKING TOOL FOR TRIMMING TREES

BACKGROUND OF THE INVENTION

The present invention relates to a hand-guided working tool, especially a trimmer for cutting tree limbs and branches, comprised of a drive motor connected to one end of a telescopic rod which drive motor is connected with a telescopic drive shaft to a working tool connected to the opposite end of the telescopic rod. The telescopic rod is comprised of an outer tube and an inner tube longitudinally displacably arranged therein. The telescopic drive shaft is comprised of a shaft tube and a shaft rod and is rotatably supported with at least two inner bearings within the outer tube.

Such a working tool is known from German Patent Application 32 13 185. Within the telescopic rod comprised of an outer tube and an inner tube, bearings for supporting the telescopic drive shaft arranged in the telescopic rod are provided in the area of the outer tube. The outer tube is supported in a connector of the drive motor at an end thereof opposite the inner tube. Roller bearings are inserted within the connector that support the end of the telescopic rod. The inner end of the inner tube positioned within the outer tube supports the shaft tube of the telescopic drive shaft with a further roller bearing which is dimensioned so as to fit the inner tube.

Between the roller bearing within the inner tube and the roller bearing at the connector of the drive motor, an intermediate bearing is provided which is axially displaceably positioned within the outer tube and is embodied as a slide bearing. A coil spring biases the slide bearing in the direction toward the penetrating end of the inner tube so that upon extension of the inner tube the intermediate bearing will follow due to the spring load acting thereon.

Via these combination bearings the telescopic drive shaft is sufficiently supported, however, the individual design of each bearing is cost intensive.

It is therefore an object of the present invention to provide a working tool with a telescopic rod such that the required support of the telescopic drive shaft is constructively simple requiring only a minimum of constructive parts.

SUMMARY OF THE INVENTION

A hand-guided working tool according to the present invention is primarily characterized by:
- a telescopic rod having a first and a second end;
- a drive motor connected to the first end of the telescopic rod;
- a working tool connected to the second end of the telescopic rod;
- a telescopic drive shaft enclosed in the telescopic rod, wherein a first end of the drive shaft is connected to the drive motor and a second end of the telescopic drive shaft is connected to the working tool;
- the telescopic rod comprised of an outer tube an inner tube inserted with a leading end into the outer tube and displaceable in a longitudinal direction of the telescopic rod;
- the telescopic drive shaft is comprised of a shaft tube and a shaft rod enclosed in the shaft tube;
- at least two bearings arranged in the outer tube for rotatably supporting the telescopic drive shaft and spaced from one another in the longitudinal direction of the telescopic rod;
- the bearings comprising a cylindrical bearing sleeve having an outer mantle surface resting at an inner wall of the outer tube, and further comprising an inner bearing positioned inside the cylindrical bearing sleeves;
- the bearing sleeve of a first one of the bearings is mounted on the leading end of the inner tube and formes a slide bearing for displacing the inner tube in the outer tube.

Preferably, a second one of the bearings is an axially fixed bearing positioned remote from the first bearing and at least one third one of the bearings is positioned between the first and the second bearing. Furthermore, a spring is provided and is supported on the second bearing and acts on the third bearing biasing the third bearing toward the first bearing.

The working tool may further comprise an abutment for limiting a displacement travel of the third bearing.

The bearing sleeves are non-rotatingly secured in the outer tube.

Advantageously, the bearing sleeves are secured at the outer tube by at least one tongue-and-groove arrangement comprised of a guide tongue and a matching guide groove.

Preferably, the guide tongue is connected to the outer tube and extends in the longitudinal direction of the telescopic rod over the entire length of the outer tube.

Advantageously, the guide groove is provided at the outer mantle surface of the bearing sleeve and the guide groove has open ends.

Two of the tongue-and-groove arrangements are spaced from one another about a circumference of the bearing sleeves.

The tongue-and-groove arrangements are preferably spaced to one another by an angular distance of 90°.

Expediently, the bearing sleeve has two apposed end faces. The outer mantle surface of the bearing sleeve has an axially extending free groove at the end faces of the bearing sleeve. The free groove is positioned in a circumferential direction of the bearing sleeve so as to coincide with a location of the abutment.

The free groove is spaced at different angular distances from the two tongue-and-groove arrangements. The free groove has a groove depth and the abutment has a radial height, wherein the groove depth is greater than the radial height.

A first one of the angular distances is 45° and a second one of the angular distances is 225°.

Each one of the bearings has coordinated therewith a rotary follower mounted between the inner bearing and the telescopic drive shaft.

The rotary follower is mounted on the shaft rod so as to be slidable in the longitudinal direction.

Advantageously, the rotary follower has an inner through opening having a cross-sectional shape matching a cross-sectional shape of the shaft rod.

The rotary follower has an axial sleeve projection enclosing a free end of the shaft tube.

The inner bearing is preferably a roller bearing having an inner ring and the rotary follower is snapped into the inner ring so as to be axially fixed.

The bearing sleeves and the rotary followers of at least some of the bearing positioned within the outer tube are identical.

Preferably, the rotary followers consist of plastic material.

The working tool may further comprise a connecting tube extending into the first end of the telescopic rod. The bearing sleeve of the axially fixed bearing engages an end of the connecting tube extending into the outer tube.

The bearing sleeve of the axially fixed bearing engages positive-lockingly the end of the connecting tube.

The connecting tube preferably connects the drive motor to the telescopic rod.

Preferably, the telescopic rod and the telescopic drive shaft consist of aluminum or an aluminum alloy. The bearing sleeves preferably consist of plastic material.

The arrangement of the inner bearings in identically embodied bearing sleeves allows for identical outer dimensions (diameter) of the bearing which are especially embodied as roller bearings. The arrangement of the bearing bodies in the form of bearing sleeves within the outer tube ensure identical outer diameter of the bearing sleeves so that they can be embodied like the bearings for the telescopic drive shaft, i.e., as identical parts. One bearing sleeve is fixedly connected to the end of the inner tube inserted into the outer tube and forms a longitudinally displaceable slide bearing guided within the outer tube. The same embodiment of the bearing sleeve as well as of the inner bearing for securing the telescopic drive shaft lowers the number of parts needed and thus reduces the manufacturing and storage costs.

In an advantageous embodiment of the invention, the third bearing sleeve (of identical construction) is positioned between the bearing sleeve connected to the inner tube and the bearing sleeve at the opposite end which is an axially fixed bearing. The third bearing sleeve is biased by a spring that is supported at the axially fixed bearing sleeve in the direction toward the slide bearing. The intermediate bearing is comprised of, like the slide bearing and the axially fixed bearing, a bearing sleeve positioned within the outer tube and an inner bearing secured in the interior thereof for rotatably supporting the telescopic drive shaft. The inner bearing and the bearing sleeve of the intermediate bearing correspond to the design of the inner bearings and the bearing sleeves of the other combination bearings positioned within the outer tube.

Expediently, the displacement travel of the bearing body (bearing sleeve) of the intermediate bearing is limited by an axial abutment penetrating into the outer tube so that a defined end position of the intermediate bearing is ensured. Preferably, the intermediate bearing rests biased by a spring at the abutment 39 so that independent of fatigue symptoms of the coil spring over a long service life, a sufficient support of the telescopic drive shaft for the inner tube in the extended position is ensured for the respective end position of the intermediate bearing.

Preferably, the bearing sleeves are rotationally fixedly positioned within the outer tube whereby the rotational position of the bearing sleeves is selected such that the bearing sleeves of the intermediate bearing will come into contact with the abutment while the bearing sleeve of the slide bearing at the inner tube can pass across the abutment.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
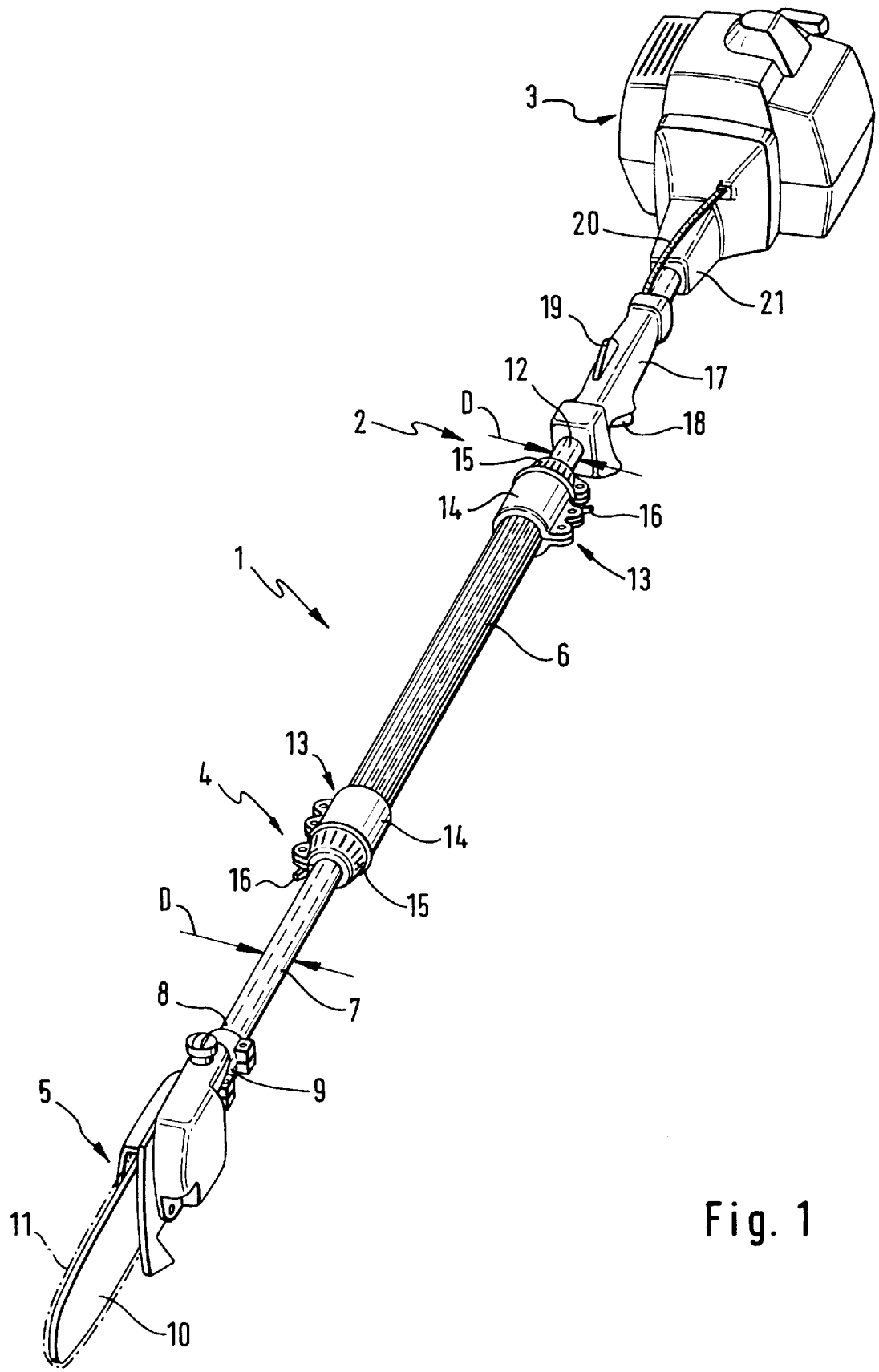
FIG. 1 is a perspective representation of a hand guided working tool for trimming tree limbs.

The present invention will now be described in detail with the aid of several specific embodiments utilizing FIGS. 1 through The hand-guided working tool represented in FIG. 1 serves for trimming trees etc. The working tool is comprised of a telescopic rod 1 that at one end 2 has connected thereto the drive motor 3 and at the other end 4 has connected thereto the working tool 5. The telescopic rod 1 is comprised of an outer tube 6 and an inner tube 7 guided longitudinally displacably therein. The free end 8 of the inner tube 7 supports a gear housing 9 with a bevel gear arrangement via which the saw chain 11 guided on a guide rail 10 is driven.

A connecting tube 12 extends into the end of the outer tube 6 which is facing away from the inner tube 7 and which is secured within the outer tube 6. At the two ends 2 and 4 of the outer tube 6 a clamping member 13 is arranged which is secured with a fastening sleeve 14 on the respective end of the outer tube 6. Adjacent to the fastening sleeve 14 a clamping sleeve 15 is provided which matches the outer diameter of the inserted inner tube 7, respectively, the inserted connecting tube 12. The clamping sleeve 15 is securable with a clamping screw 16 on the inserted tube 7, respectively, 12.

The connecting tube 12 is arranged between the outer tube 6 and the drive motor 3 and supports an operator handle 17 at which are arranged a throttle lever 18 and a throttle lever lock 19. The throttle lever 18 is connected with a Bowden cable 20 to a control element for operating the drive motor 3. In the shown embodiment, the drive motor is an internal combustion engine, especially a two-stroke internal combustion engine. The control member actuated by the Bowden cable 20 is the throttle valve of the carburetor via which the drive motor is provided with the airfuel mixture.

For achieving a simple construction with conventional tubes the connecting tube 12 and the inner tube 7 have the same diameter, especially the same outer diameter D. This makes it possible to use as a drive motor 3 for the inventive device a conventional trimmer motor. The connector 21 at the motor housing can remain unchanged when the connecting tube 12 corresponds to the diameter of the guide tube conventionally used with trimmers. The connecting tube 12 allows for a simple and expedient connection to the telescopic rod 1. The required clamping members 13 on the ends of the outer tube 6 are of identical construction because the connecting tube 12 and the inner tube 7 have the same outer diameter D.

Figure 2:
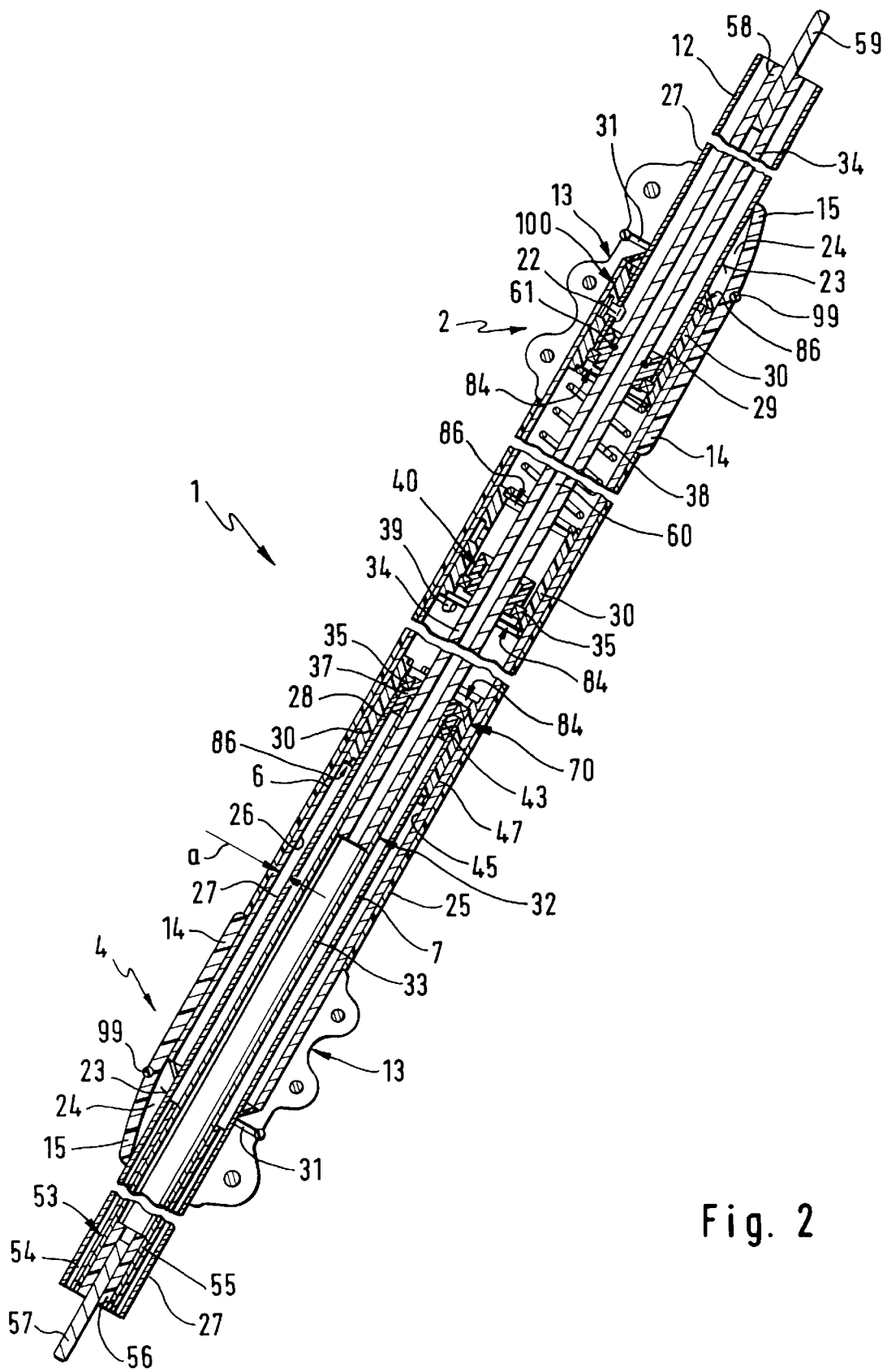
FIG. 2 is a longitudinally section of a telescopic rod of the working tool according to FIG. 1.

In the longitudinal section shown in FIG. 2 the detailed design of the telescopic rod 1 is shown. The outer mantle 27 of the inner tube 7 is positioned at a radial distance a to the inner circumference 26 of the outer tube 6. The inner end 28 of the inner tube 7 is secured at a bearing body or bearing sleeve 30. The inner end 28 of the inner tube projects into the bearing sleeve 30. Preferably, the bearing sleeve 30 is connected to the inner end 28, especially riveted thereto. The bearing sleeve 30 forms a slide bearing 70 which can be displaced in the longitudinal direction of the outer tube 6.

In the same manner, the end 29 of the connecting tube 12 is introduced and secured in the outer tube 6. The bearing body or bearing sleeve 30 engages the end 29 and is secured at the connecting tube 12, especially with a rivet 22, in a positive-locking manner. The bearing sleeve 30 is non-slidably secured within the outer tube 6 and thus provides an axially fixed bearing 100 for the connecting tube 12.

At the two ends 2 and 4 of the connecting tube 6 the fastening sleeve 14 of the clamping member 13 is frictionally connected. A positive-locking connection on the outer tube 6 can also be expedient. Between the two clamping members 13 the outer tube 6 is enclosed by a hose, especially a profiled hose 25, having profilings in the longitudinal direction the outer tube 6. The outer tube 6 is thus provided with increased grip so that it can be used as a grip rod.

The clamping members 13 engage with their clamping sleeves 15 the tubes 7 and 12 inserted therein whereby the clamping sleeve 15 has an inner guide surface 23 which rests at the outer mantle 27 of the tubes 7 and 12. The guide surface 23 is partly formed by axial stays 24 which extends substantially over the length of the clamping sleeve 15 and, in the circumferental direction, are positioned at a distance to one another. The fastening sleeve 14 and the clamping sleeve 15 form a one-part slotted sleeve whereby the clamping sleeve 15 is separated from the fastening sleeve 14 by a circumferential slot 31 which extends over a circumferential distance of less than 300°, especially 225°.

Figure 4:
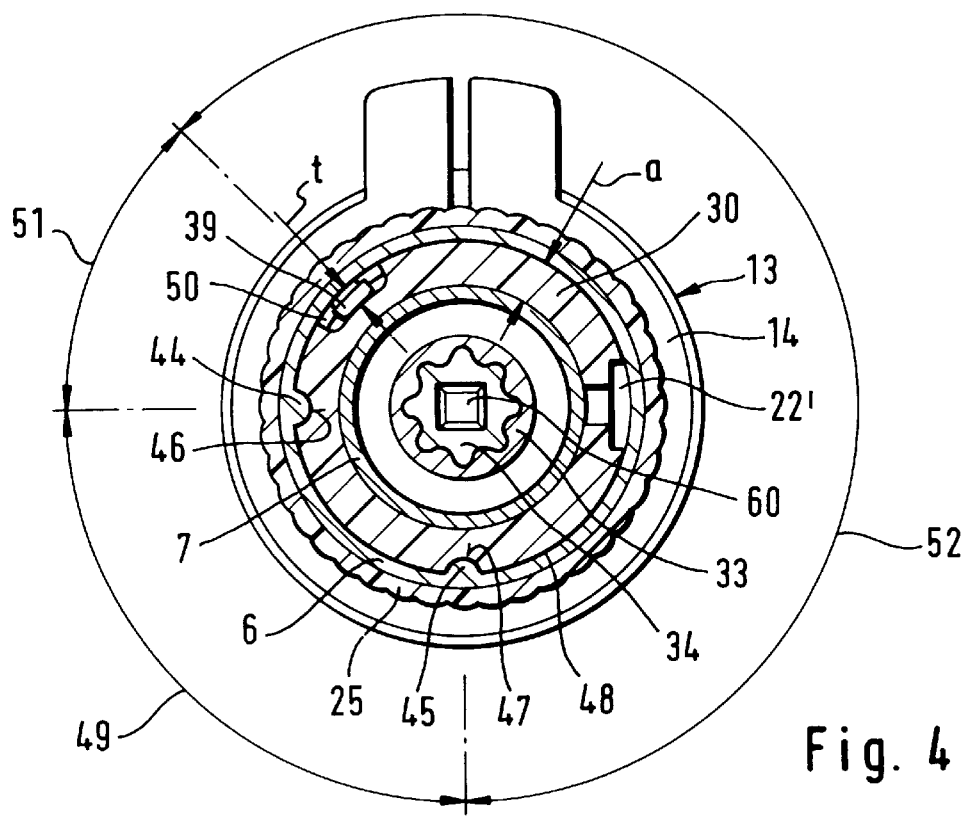
FIG. 4 is a section along the line IV—IV of FIG. 3.

The drive connection between the drive motor 3 and the working tool 5 is provided in the form of a telescopic drive shaft 32 which consists of a shaft tube 33 and a shaft rod 34. As shown in FIG. 4, the shaft tube 33 in the circumferential direction has a wave-shaped toothed longitudinal profile that is engaged by the matching outer profile of shaft tube 34 such that a rotationally fixed but longitudinally slidable connection is provided. Along the length of the outer tube 6 the telescopic drive shaft 32, especially its shaft tube 34, is rotatably supported within the bearing sleeves 30. For this purpose, in the bearing sleeves 30 an inner bearing, especially a roller bearing 35, is provided whereby a rotary follower 37 is frictionally secured in the inner ring 36. The rotary follower 37 has a cross-sectional shape that matches the profile of the shaft rod 34 and is slipped onto the shaft rod 34 so as to be axially displaceable. The shaft rod 34 is thus rotatably supported by the rotary follower 37 and the roller bearing within the bearing sleeve 30 which, as will be disclosed in the following, is rotationally fixedly secured within the outer tube 6.

Between the bearing sleeve 30 of the axially fixed bearing 100 of the connecting tube 12 and the bearing sleeve 30 of the slide bearing 70, an intermediate bearing 40 is arranged which is comprised of a bearing sleeve 30 that is axially displaceably guided but rotationally fixedly positioned in the outer tube 6. In the bearing sleeve 30, like in the other bearing sleeves, an inner bearing in the form of a roller bearing 35 is provided that has a rotary follower 37 displaceably guided on the shaft rod 34. The intermediate bearing 40 is biased by a coil spring 38 in the direction toward the slide bearing 70 whereby the coil spring 38 is supported at the bearing sleeve 30 of the bearing 100 positioned at the connecting tube 12. The displacement stroke of the intermediate bearing 40 is limited by an axial abutment 39 which projects radially into the interior of the outer tube 6. In the end position determined by the abutment 39 the intermediate bearing 40 rests under spring force at the abutment 39.

Figure 3:
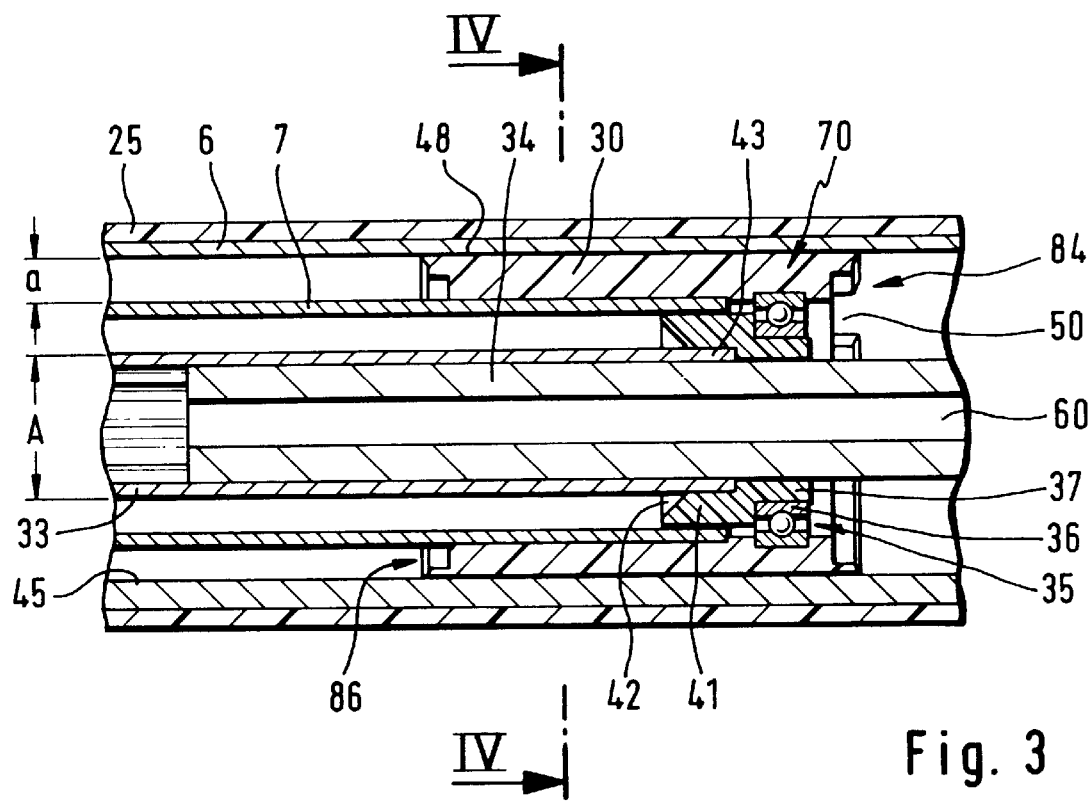
FIG. 3 shows in an enlarged representation a longitudinal section of an end section of the inner tube guided by a bearing sleeve within the outer tube of the telescopic rod.

As can be seen especially in FIGS. 3 and 4, the shaft tube 33, positioned within the inner tube 7 with its end 43 facing the shaft rod 34, is supported within the rotary follower 37 for which purpose the rotary follower 37 comprises a sleeve projection 41 that engages frictionally the end 43 of the shaft tube 33. For facilitating introduction of the end 43 of the shaft tube 33 into the rotary follower 37, an insertion cone 42 is provided. The end 43 is thus, on the one hand, centered within the telescopic rod 1 and, on the other hand, rotatably supported via the rotary follower 37 at the roller bearing 35. Due to the axial support of the end 43 within the sleeve projection 41, an axial securing is provided which may be enhanced further by a frictional connection at the sleeve projection.

The bearing sleeves 30 are rotationally fixedly positioned within the outer tube 6. For this purpose, over the entire length of the outer tube 6, tongue-and-groove arrangements are provided, including at least one axial guide tongue 44, 45 which engages a matching guide groove 46, 47. In the shown embodiment, at the outer circumference 26 of the outer tube 6, two guide tongues 44 and 45 are arranged which, in the circumferential direction, are positioned relative to one another at an angular distance 49 of preferably 90°. In the corresponding angular position 49 open guide grooves 46 and 47 are formed at the outer mantle surface of the bearing body. They are open at the end faces. The guide groove 46 has positioned adjacent thereto an axially open free groove 50 of the radial depth t which is greater that the radially projecting height of the axial abutment 39. The free groove 50 is positioned adjacent to the guide groove 46 at an angular distance 51. The angular distance 52 to the guide groove 47 at the other side is greater than the angular distance 51. The greater angular distance 52 is 225°. The guide groove 46 has oppositely arranged thereto at the wall of the bearing sleeve 30 a rivet opening 22' for receiving a rivet (compare rivet 22 in FIG. 2).

The axial abutment 39 is positioned adjacent to the guide tongue 44 at an angular distance 51 of preferably 45°. In the mounted position shown in FIG. 4, the free groove 50 and the axial abutment 39 are positioned, viewed in the longitudinal direction of the outer tube 6, so as to be congruent so that, when retracting the telescopic rod 1, the bearing sleeve 30 of the bearing 70 of the inner tube 7 can pass the axial abutment 39. The intermediate bearing 40 is displaced counter to the force of the coil spring 38 toward the connecting tube 12. As shown in FIG. 1, the bearing sleeve 30 of the intermediate bearing 40 is secured in a rotated position of 180° within the outer tube 6 so that the free groove 50 of the guide tongue 45 is positioned at an angular distance of 45° thereto. The axial abutment 39 and the free groove 50 are not congruent in the displacement direction of the intermediate bearing 40 so that it is impossible for the bearing sleeve 30 of the intermediate bearing 40 to pass the axial abutment 39. The bearing sleeve 30 of the intermediate bearing 40 thus contacts the abutment 39. The axial displacement of the intermediate bearing 40 is limited accordingly.

The shaft tube 33 of the telescopic drive shaft 32 is supported in the inner tube 7 of the telescopic rod 1 by the elongate bearing 53. The bearing 53 is comprised of a plastic hose, a so-called liner. The tube shaft 33 is rotatably supported in the liner. The liner itself is radially centered with axial stays 54 of a short radial length within the inner tube 7. Preferably, it is rigidly supported.

Into the end 55 of the shaft tube 33, positioned at the open end of the inner tube 7, an adapter piece 56 is rotatably fixedly inserted which adapter piece 5b is comprised of plastic. It supports a square member 57 as a coupling piece to the bevel gear arrangement. It may be expedient to provide a cut-to-length section of the shaft rod 34 as an adapter piece whereby the square member 57 is press-fit into the shaft section. The end 58 of the shaft rod 34 facing the drive motor 3 supports a corresponding square member 59 for connection to the drive motor 3. The square member 59 is coaxially positioned within a through channel 60 of the shaft rod 34. For axially securing the shaft rod 34 a spring ring 61 is provided which is resting at the side of the rotary follower 37 facing the connecting tube 12 and positioned within the bearing sleeve 30 axially fixed (rivetted) to the connecting tube 12. The axial securing of the shaft tube 33 is ensured by its axial support within the rotary follower 37 that is secured at the bearing sleeve 30 connected to the end 28 of the inner tube 7.

The bearing sleeves 30 as well as the inner bearings 35 and the rotary followers 37 of all combination bearings 40, 70, 100 are identical parts, i.e., they can be exchanged freely between bearings.

Figure 5:
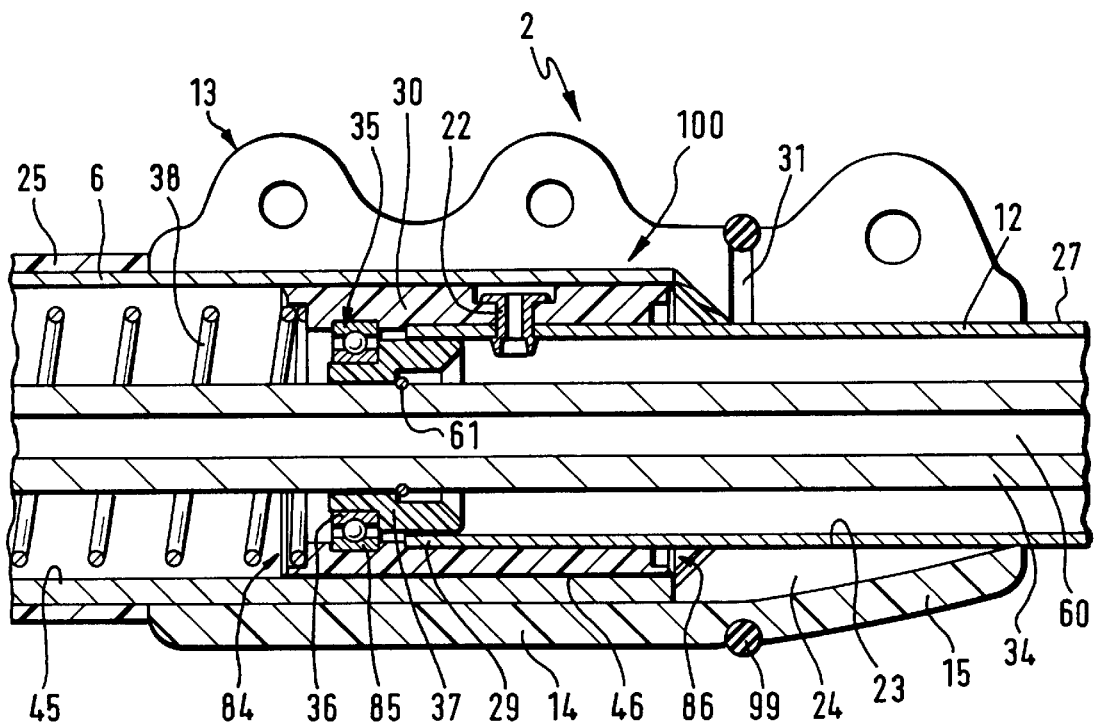
FIG. 5 shows in an enlarged representation a longitudinal section of the end section of the connecting tube supported within the outer tube of the telescopic rod by a bearing sleeve.

FIG. 5 shows the fixedly arranged bearing 100 at the end 2 of the outer tube 6. The connecting tube 12 projects with its end 29 into the outer tube 6. The end 29 is positive-lockingly secured by a rivet 22 on the bearing sleeve 30.

According to the embodiment in FIG. 3, the bearing sleeve 30 engages the end 29 and supports in this area an inner bearing, especially a roller bearing 35. Preferably, the outer ring 85 of the roller bearing 35 is securely held within the bearing sleeve 30. Especially, the outer ring 85 is injection molded into the bearing sleeve 30 that is comprised of plastic material.

A rotary follower 37 is snapped into the inner ring 36 of the roller bearing 35. It is represented in detail in FIGS. 11 through 14. The rotary follower 37 is axially displacably positioned on the shaft rod 34, but is rotatably fixedly connected to the shaft rod 34. The spring ring 61 positioned on the shaft rod 34 secures the axial position of the shaft rod 34 because the bearing sleeve 30 of the axially fixed bearing 100 is clamped by the clamping sleeve 15 onto the connecting tube 12 so as to be axially non-displacable within the outer tube 6. The fastening sleeve 14 is frictionally connected to the end 2 of the outer tube 6. The clamping sleeve 15 secures the axial position of the connecting tube 12 relative to the outer tube 6 by its guide surface 23 being clamped onto the outer mantle 27 of the connecting tube 12.

Figure 6:
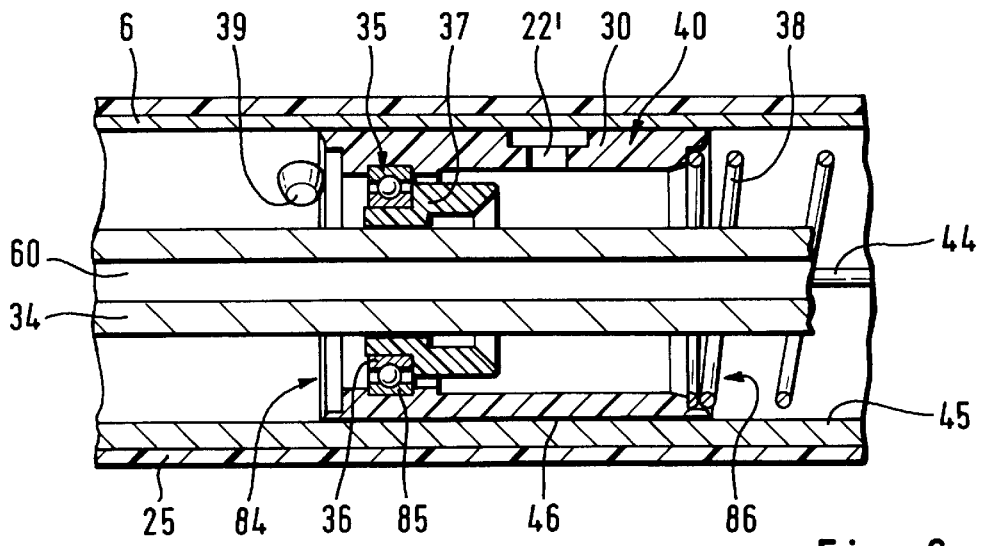
FIG. 6 is an enlarged representation of a longitudinal section of the intermediate bearing displacable within the outer tube of the telescopic rod.

The intermediate bearing 40 shown in FIG. 2 is displaceable by the coil spring 38 and is represented in detail in FIG. 6. The coil spring 38 is provided between the axially fixed bearing 100 (FIG. 5) and the facing end 86 of the bearing sleeve 30 of the intermediate bearing 40.

The intermediate bearing 40, like the fixed bearing 100 or the slide bearing 70, is comprised of an identically constructed bearing sleeve 30 with inner bearing, preferably, roller bearing 35, and a rotary follower 37. The bearing sleeve 30 is axially freely displaceable by the coil spring 38 whereby the displacement stroke is limited by the axial abutment 39 extending radially into the interior of outer tube 6.

Figure 7:
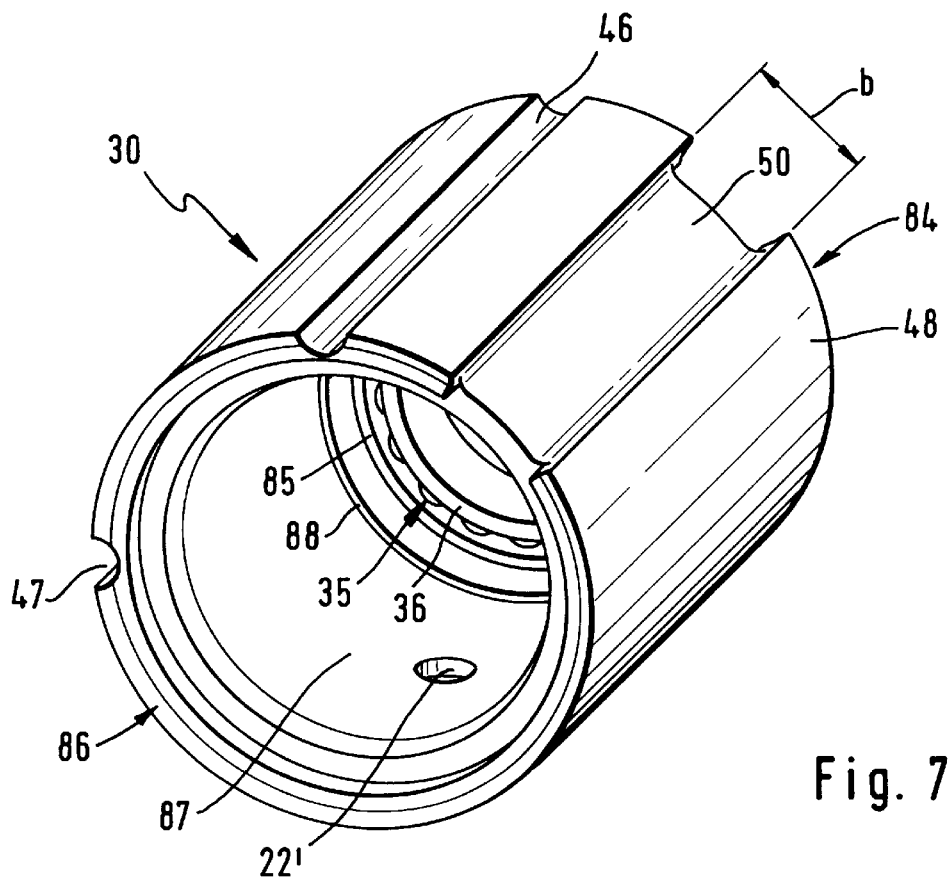
FIG. 7 is a perspective representation of a bearing sleeve.
Figure 8:
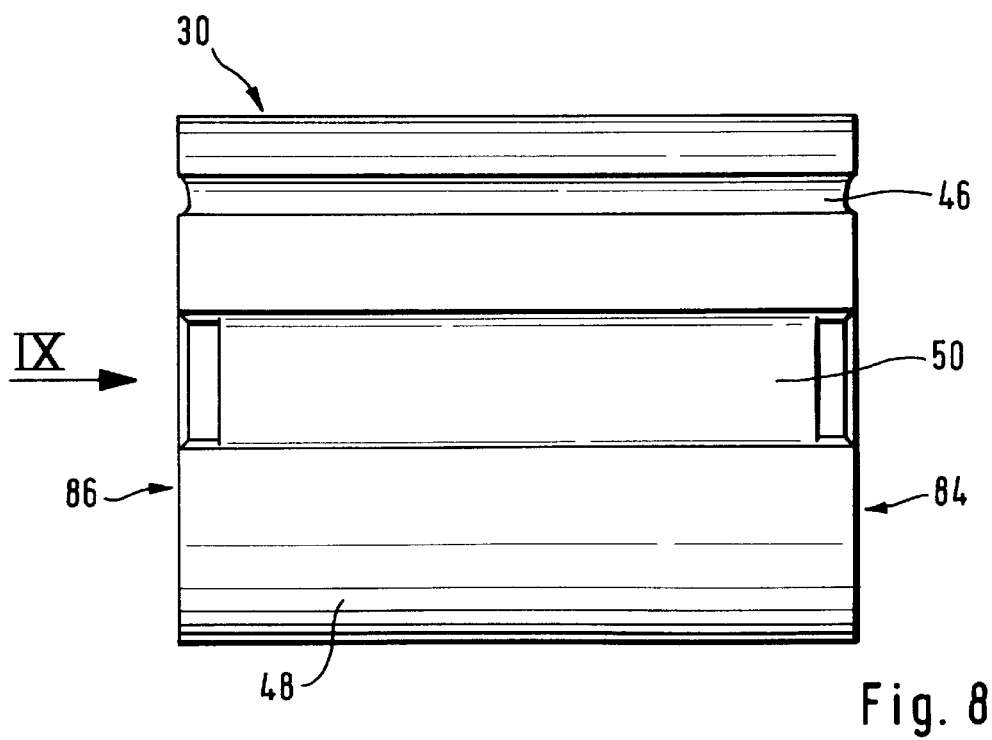
FIG. 8 is a side view of the bearing sleeve of FIG. 7.
Figure 9:
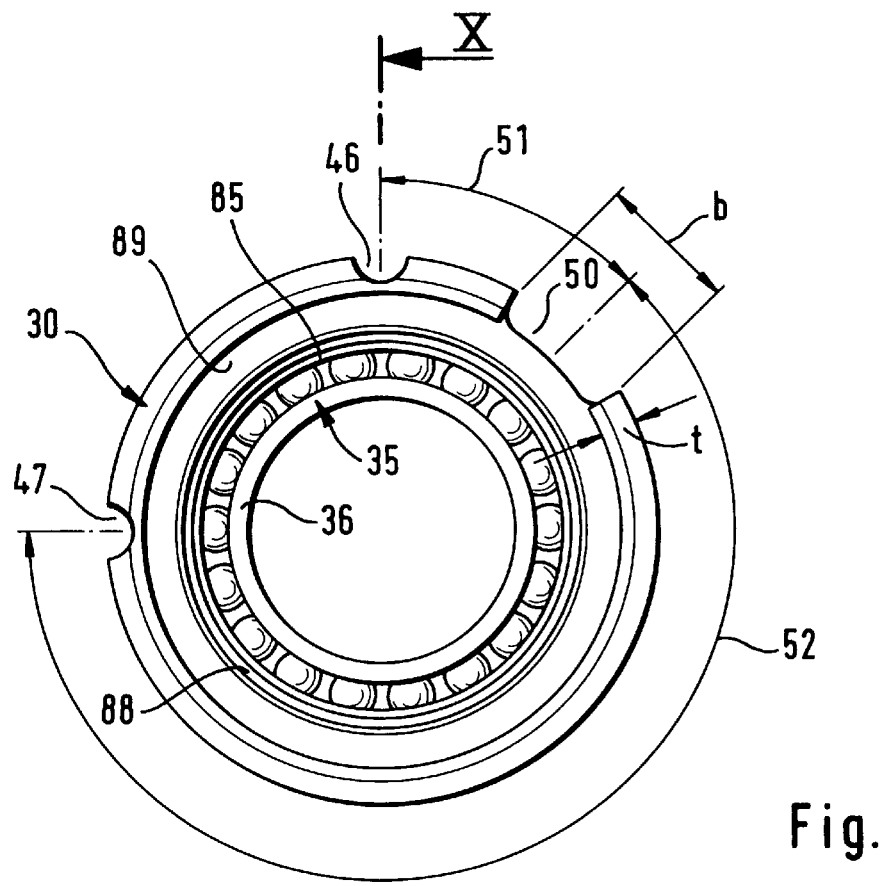
FIG. 9 is a view of the bearing sleeve according to arrow IX of FIG. 8.

All bearings sleeves 30 have, as shown in FIG. 7, axially extending guide grooves 46, 47 open at their end faces which are engaged by guide tongues 44, 45 expending over the entire length of the outer tube 6 and provided at its inner circumference 26.

The guide tongues 44, 45 as well as the guide grooves 46, 47 have in cross-section a part-circular shape which ensures a good gliding behavior.

Figure 10:
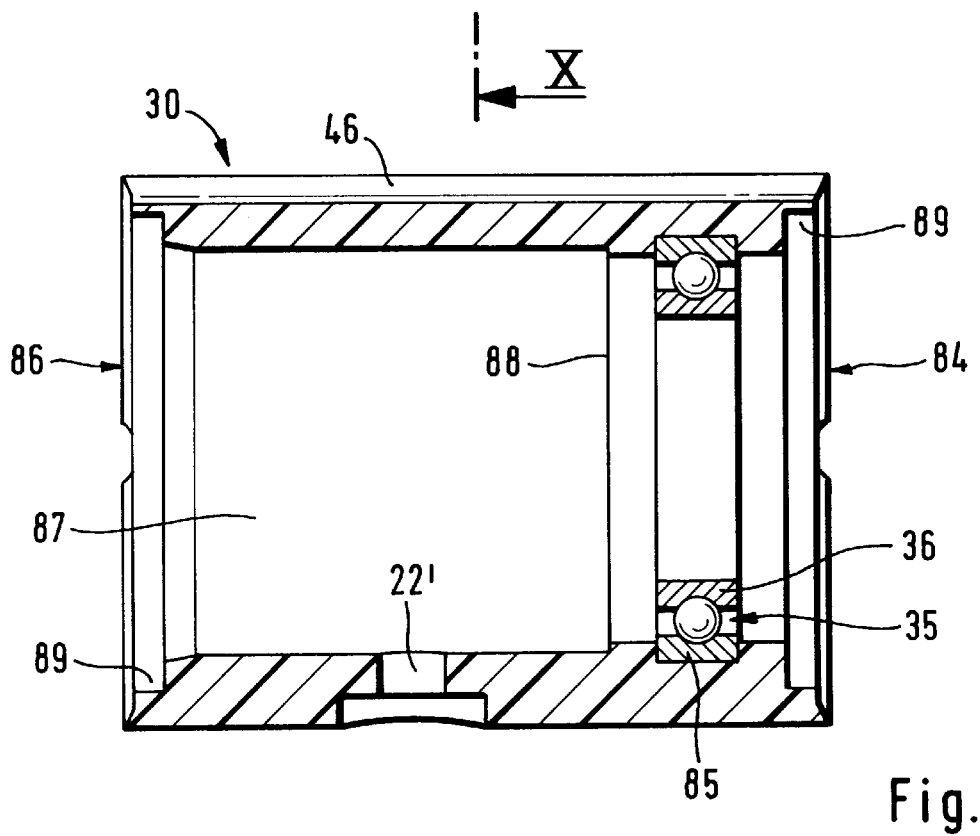
FIG. 10 is a section along the line X—X of FIG. 9.
Figure 11:
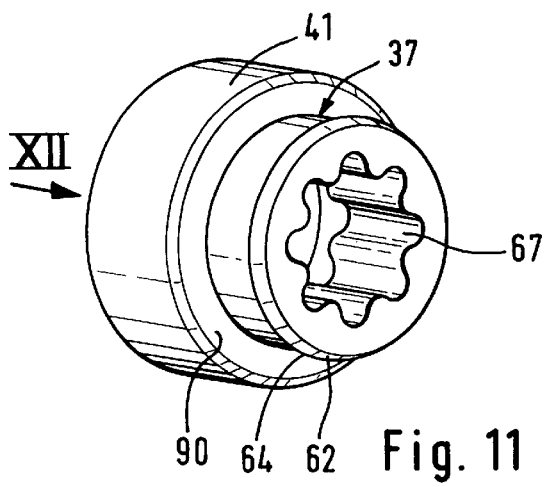
FIG. 11 is a perspective representation of a rotary follower positioned within a bearing sleeve.

Within the outer mantle 48, a free groove 50 is arranged which, in the circumferential direction, is closer to the guide groove 46 than to the guide groove 47. A rivet opening 22' is positioned opposite the guide groove 46 at half the length of the bearing sleeve 30. The inner bearing in the form of a roller bearing 35 for the telescopic drive shaft is positioned close to the end 84 of the bearing sleeve 30 whereby at the other end 86 of the bearing sleeve 30 a receiving section 87 for receiving the inner tube 7, respectively, the connecting tube 12 is provided. The insertion depth of the tube is limited by an annular step 88 (FIG. 10).

The FIGS. 7 through 10 show a depression 89 which is provided at the end faces of the bearing sleeves 30 which, as shown in FIGS. 5 and 6, are provided for the frictional engagement of the respective end of the coil spring 38.

Figure 12:
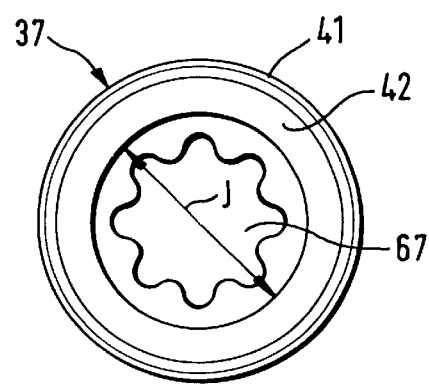
FIG. 12 is an end view of the rotary follower according in the direction of arrow XII in FIG. 11.
Figure 14:
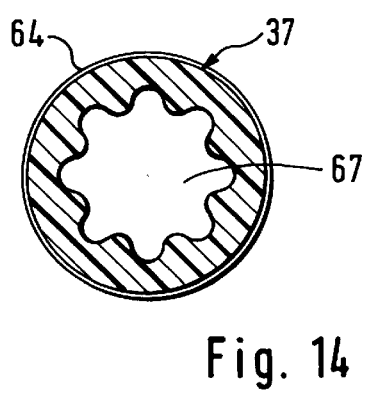
FIG. 14 is a section along the line XIV—XIV of FIG. 13.
Figure 13:
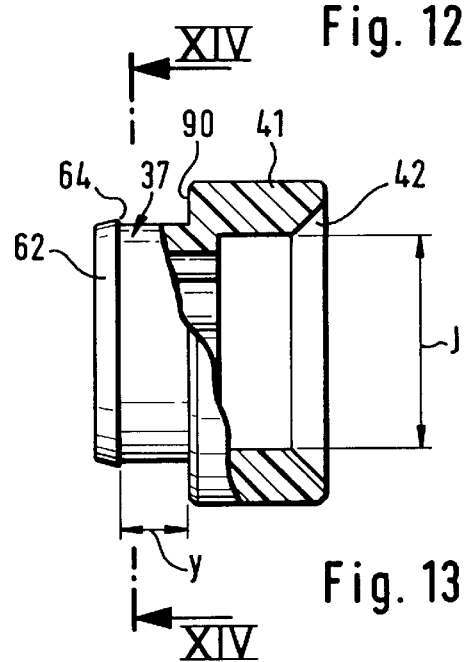
FIG. 13 is a longitudinal part-sectional view of the rotary follower according to FIG. 11.

The rotary follower 37, represented in detail in FIGS. 11 through 14, has a through opening 67 with an inner contour that is profiled in the longitudinal direction so that a wave-shaped cross-sectional shape results, as shown in FIGS. 12 and 14.

The shaft rod 34, as shown in FIG. 4, is provided in the same manner with a longitudinal profiling which extends over the entire circumference and matches perfectly the through opening 67 so that the rotary follower 37 can be axially longitudinally displaced while being rotationally fixed within the shaft rod 34.

The rotary follower 37 at the end facing the sleeve projection 41 has a bevel 62 which has a raised rim 64 facing the rotary follower 37. The sleeve projection 41 is provided with a greater outer diameter than the rotary follower 37 so that an angular shoulder 90 is formed. The distance y between the annular shoulder 90 and the raised rim 64 of the bevel 62 corresponds approximately to the width of the inner ring 36 of the roller bearing 35 so that, after axially snapping the rotary follower 37 into the inner ring 36 of the roller bearing 35, the rotary follower 37 is axially secured within the roller bearing 35. The bevel 62 is provided for facilitating introduction of the rotary follower 37 into the inner ring 36.

The inner diameter I of the sleeve projection 41 matches the outer diameter A (FIG. 3) of the shaft tube 33 such that the end 43 of the shaft tube 33 is frictionally secured within the sleeve projection 41. For facilitating introduction, an insertion cone 42 at the open end of the sleeve projection 41 is provided.

The rotary follower 37 is snapped into the inner ring 36 of the roller bearing 35 secured within the sleeve 30 such that the sleeve projection 41 faces the distal end 86 of the bearing sleeve 30. It is of no consequence whether the shaft tube 33 is secured in the sleeve projection 41 or not.

As shown in FIG. 2, the bearing sleeves 30 of the intermediate bearing 40 and the axially fixed bearing 100 are positioned such that their end 84 proximal to the roller bearing 35 faces the inner tube 7. The bearing sleeve 30 of the slide bearing 70 is arranged such that the end 84 proximal to the roller bearing 35 faces the end 84 of the bearing sleeve 30 of the intermediate bearing 40. The receiving section 87 of the bearing sleeve 30 of the slide bearing 70 faces the inner tube 7. The end 28 is inserted up to the annular step 88 into the receiving section 87 and is positive-lockingly secured therein, especially by riveting. The bearing sleeve 30 of the slide bearing 70, when compared to the bearing sleeves 30 of the intermediate bearing 40 and of the axially fixed bearing 100, is thus rotated by 180° within the outer tube 6 of the telescopic rod 1. As can be seen in FIG. 4, the axial abutment 39 in the outer tube 6 is in the vicinity of the guide tongue 44, i.e., the angular distance of the axial abutment 39 to the guide tongue 44 corresponds to the angular distance 51 between the free groove 50 and the guide groove 46 within in the mantle 48 of the bearing sleeve 30. In the shown mounted position of the bearing sleeve 30 of the slide bearing 70, when viewed in the axial direction of the outer tube 6, the free groove 50 and the axial abutment 39 are thus congruent to one another whereby the width b of the free groove 50 is wider than the width of the axial abutment 39 measured in the circumferential direction. The depth t of the free groove 50 is greater than the radial height of the axial abutment 39. Since the guide tongue 44 of the outer tube 6 is positioned in the guide groove 46 of the bearing body 30 and thus fixes the rotational position of the bearing sleeve 30 such that the free groove 50 in the axial direction is congruent to the axial abutment 39, the bearing sleeve 30 of the slide bearing 70 can be moved across the axial abutment 39. Due to the mounted position of the bearing sleeve 30 of the slide bearing 70, the axial abutment 39 is inactive for slide bearing 70. This means that the telescopic rod 1 can be extended or shortened independent of the axial abutment 39.

As shown in FIG. 2, the bearing sleeve 30 of the intermediate bearing 40 is mounted relative to the bearing sleeve 30 of the glide bearing 70 so as to be rotated by 180°, i.e., the ends 84 of the bearing sleeve 30 of intermediate bearing 40 and slide bearing 70 face one another. Due to this reverse mounting, the guide tongue 45 of the outer tube 6 engages the guide groove 46 of the bearing sleeve 30 of the intermediate bearing 40. The guide tongue 44 engages the guide groove 47 of the bearing sleeve 30 (FIG. 6). The free groove 50 is positioned adjacent to the guide groove 46 and, due to the rotated mounted position (rotation by 180°), is now adjacent to the guide tongue 45 while the axial abutment 39 is positioned so as to be adjacent to the guide tongue 44. The axial abutment 39 and the free groove 50 are positioned, in the circumferential direction, at an angular distance to one another. The free groove 50 is no longer axially aligned with the axial abutment 39. The intermediate bearing 40 cannot pass the axial abutment 39. The end 84 abuts the axial abutment 39 so that the axial displacement of the intermediate bearing 40 is limited and the intermediate bearing 40 thus has a defined end position.

The bearing sleeve 30 of the fixed bearing 100 is mounted corresponding to the mounting of the bearing sleeve 30 of the intermediate bearing 40.

Figure 15:
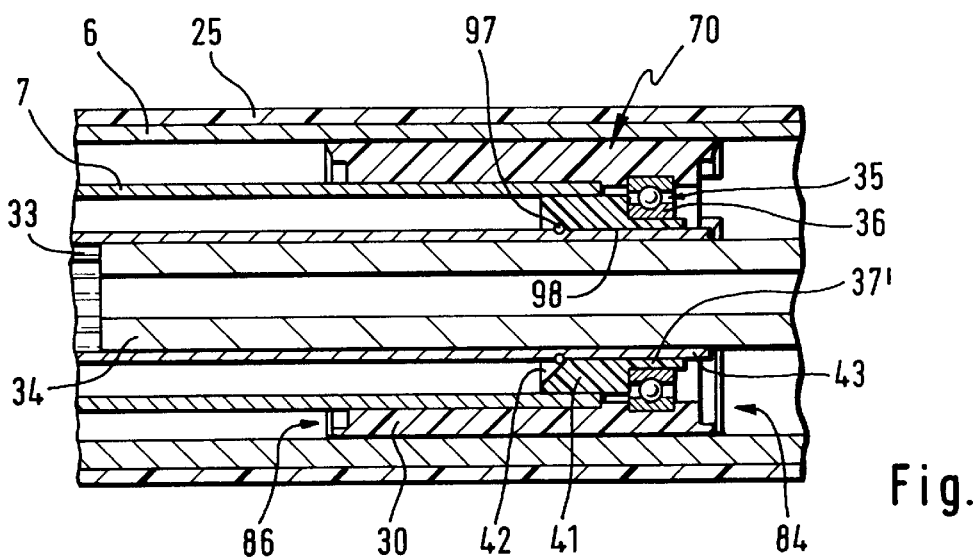
FIG. 15 is a representation of a further embodiment of a bearing sleeve connected to the end of the inner tube in a view according to FIG. 3.

It may be expedient to embody the slide bearing 70 according to the representation of FIG. 15. With the exception of the embodiment of the rotary follower 37', this design corresponds to that of FIG. 3 so that same parts are identified with the same reference numerals. The rotary follower 37' has an essential axially open receiving element 98 in which the end 43 of the shaft tube 33 is positioned. The shaft tube 33 penetrates the receiving element 98 whereby the end face of the end 43 is positioned substantially in the plane of the end face of the end 84 of the bearing sleeve 30. As a securing means against axial sliding, a spring ring 97 is secured on the shaft tube 33 which is supported on the insertion cone 42 of the sleeve projection 41. In addition, or as an alternative, a frictional securing of the end 43 in the receiving element 98 of the rotary follower 37' may be advantageous. The end 43 of the shaft tube 33 thus secured in the rotary follower 37' is rotatably supported by the roller bearing 35 in the bearing sleeve 30 and is substantially coaxially centered within the inner tube 7, respectively, the outer tube 6.

The present invention is, of course, in no way restricted to the specific disclosure of the specification and drawings, but also encompasses any modifications within the scope of the appended claims.

It is claimed:

1. A hand-guided working tool comprising:
   a telescopic rod having a first and a second end;
   a drive motor connected to said first end of said telescopic rod;
   a working tool connected to said second end of said telescopic rod;
   a telescopic drive shaft enclosed in said telescopic rod, wherein a first end of said drive shaft is connected to said drive motor and a second end of said telescopic drive shaft is connected to said working tool;
   said telescopic rod comprised of an outer tube and an inner tube inserted with a leading end into said outer tube and displaceable in a longitudinal direction of said telescopic rod;
   said telescopic drive shaft comprised of a shaft tube and a shaft rod enclosed in said shaft tube;
   at least two bearings arranged in said outertube for rotatably supporting said telescopic drive shaft and spaced from one another in said longitudinal direction of said telescopic rod;
   said bearings comprising a cylindrical bearing sleeve having an outer mantle surface resting at an inner wall of said outer tube, and further comprising an inner bearing positioned inside said cylindrical bearing sleeve;
   wherein said bearing sleeve of a first one of said bearings is mounted on said leading end of said inner tube and forming a slide bearing for displacing said inner tube in said outer tube,
   wherein a second one of said bearings is an axially fixed bearing positioned remote from said first bearing;
   wherein a third one of said bearings is positioned between said first and said second bearings and is rotated by 180° relative to said first bearing;
   a spring supported on said second bearing and acting on said third bearing for biasing said third bearing toward said first bearing;
   an abutment for limiting a displacement travel of said third bearing, wherein said third bearing is forced by said spring against said abutment and wherein said first bearing is able to pass said abutment.

2. A working tool according to claim 1, wherein a second one of said bearings is an axially fixed bearing positioned remote from said first bearing and wherein at least one third one of said bearings is positioned between said first and said second bearings, further comprising a spring supported on said second bearing and acting on said third bearing for biasing said third bearing toward said first bearing.

3. A working tool according to claim 2, further comprising an abutment for limiting a displacement travel of said third bearing.

4. A working tool according to claim 3, wherein said bearing sleeves are non-rotatingly secured in said outer tube.

5. A hand-guided working tool comprising:
a telescopic rod having a first and a second end;
a drive motor connected to said first end of said telescopic rod;
a working tool connected to said second end of said telescopic rod;
a telescopic drive shaft enclosed in said telescopic rod, wherein a first end of said drive shaft is connected to said drive motor and a second end of said telescopic drive shaft is connected to said working tool;
said telescopic rod comprised of an outer tube and an inner tube inserted with a leading end into said outer tube and displaceable in a longitudinal direction of said telescopic rod;
said telescopic drive shaft comprised of a shaft tube and a shaft rod enclosed in said shaft tube;
at least two bearings arranged in said outertube for rotatably supporting said telescopic drive shaft and spaced from one another in said longitudinal direction of said telescopic rod;
said bearings comprising a cylindrical bearing sleeve having an outer mantle surface resting at an inner wall of said outer tube, and further comprising an inner bearing positioned inside said cylindrical bearing sleeve;
wherein said bearing sleeve of a first one of said bearings is mounted on said leading end of said inner tube and forming a slide bearing for displacing said inner tube in said outer tube;
wherein said bearing sleeves are secured at said outer tube by at least one tongue-and-groove arrangement comprised of a guide tongue and a matching guide groove.

6. A working tool according to claim 5, wherein:
said guide tongue is connected to said outer tube and extends in said longitudinal direction of said telescopic rod over an entire length of said outer tube;
said guide groove is provided at said outer mantle surface of said bearing sleeves; and
said guide groove has open ends.

7. A working tool according to claim 5, wherein two of said tongue-and-groove arrangements are spaced from one another about a circumference of said bearing sleeves.

8. A working tool according to claim 7, wherein said tongue-and-groove arrangements are spaced to one another by an angular distance of 90°.

9. A working tool according to claim 7, wherein:
said bearing sleeve has two opposed end faces;
said outer mantle surface of said bearing sleeve has axially extending free groove open at said end faces of said bearing sleeve;
said free groove is positioned in a circumferential direction of said bearing sleeve so as to coincide with a location of said abutment;
said free groove is spaced at different angular distances from said two tongue-and-groove arrangements;
said free groove has a groove depth;
said abutment has a radial height;
said groove depth is greater than said radial height.

10. A working tool according to claim 9, wherein a first one of said angular distances is 45° and a second one of said angular distances is 225°.

11. A working tool according to claim 1, wherein each one of said bearings has coordinated therewith a rotary follower mounted between said inner bearing and said telescopic drive shaft.

12. A working tool according to claim 11, wherein said rotary follower is mounted on said shaft rod so as to be slidable in said longitudinal direction.

13. A working tool according to claim 12, wherein said rotary follower has an inner through opening having a cross-sectional shape matching a cross-sectional shape of said shaft rod.

14. A working tool according to claim 11, wherein said rotary follower has an axial sleeve projection enclosing a free end of said shaft tube.

15. A working tool according to claim 11, wherein said inner bearing is a roller bearing having an inner ring and wherein said rotary follower is snapped into said inner ring so as to be axially fixed.

16. A working tool according to claim 11, wherein said bearing sleeves and said rotary followers of at least some of said bearings positioned within said outer tube are identical.

17. A working tool according to claim 11, wherein said rotary followers consist of plastic material.

18. A hand-guided working tool comprising:
telescopic rod having a first and a second end;
a drive motor connected to said first end of said telescopic rod;
a working tool connected to said second end of said telescopic rod;
a telescopic drive shaft enclosed in said telescopic rod, wherein a first end of said drive shaft is connected to said drive motor and a second end of said telescopic drive shaft is connected to said working tool;
said telescopic rod comprised of an outer tube and an inner tube inserted with a leading end into said outer tube and displaceable in a longitudinal direction of said telescopic rod;
said telescopic drive shaft comprised of a shaft tube and a shaft rod enclosed in said shaft tube;
at least two bearings arranged in said outer tube for rotatably supporting said telescopic drive shaft and spaced from one another in said longitudinal direction of said telescopic rod;
said bearings comprising a cylindrical bearing sleeve having an outer mantle surface resting at an inner wall of said outer tube, and further comprising an inner bearing positioned inside said cylindrical bearing sleeve;
wherein said bearing sleeve of a first one of said bearings is mounted on said leading end of said inner tube and forming a slide bearing for displacing said inner tube in said outer tube;
a second one of said bearings is an axially fixed bearing positioned remote from said first bearing;
a connecting tube extending into said first end of said telescopic rod, wherein said bearing sleeve of said axially fixed bearing engages an end of said connecting tube extending into said outer tube.

19. A working tool according to claim 18, wherein said bearing sleeve of said axially fixed bearing engages positive-lockingly said end of said connecting tube.

20. A working tool according to claim 18, wherein said connecting tube connects said drive motor to said telescopic rod.

21. A working tool according to claim 1, wherein said telescopic rod and said telescopic drive shaft consist of aluminum or an aluminum alloy and wherein said bearing sleeves consist of plastic material.

* * * * *